Patented Oct. 26, 1943

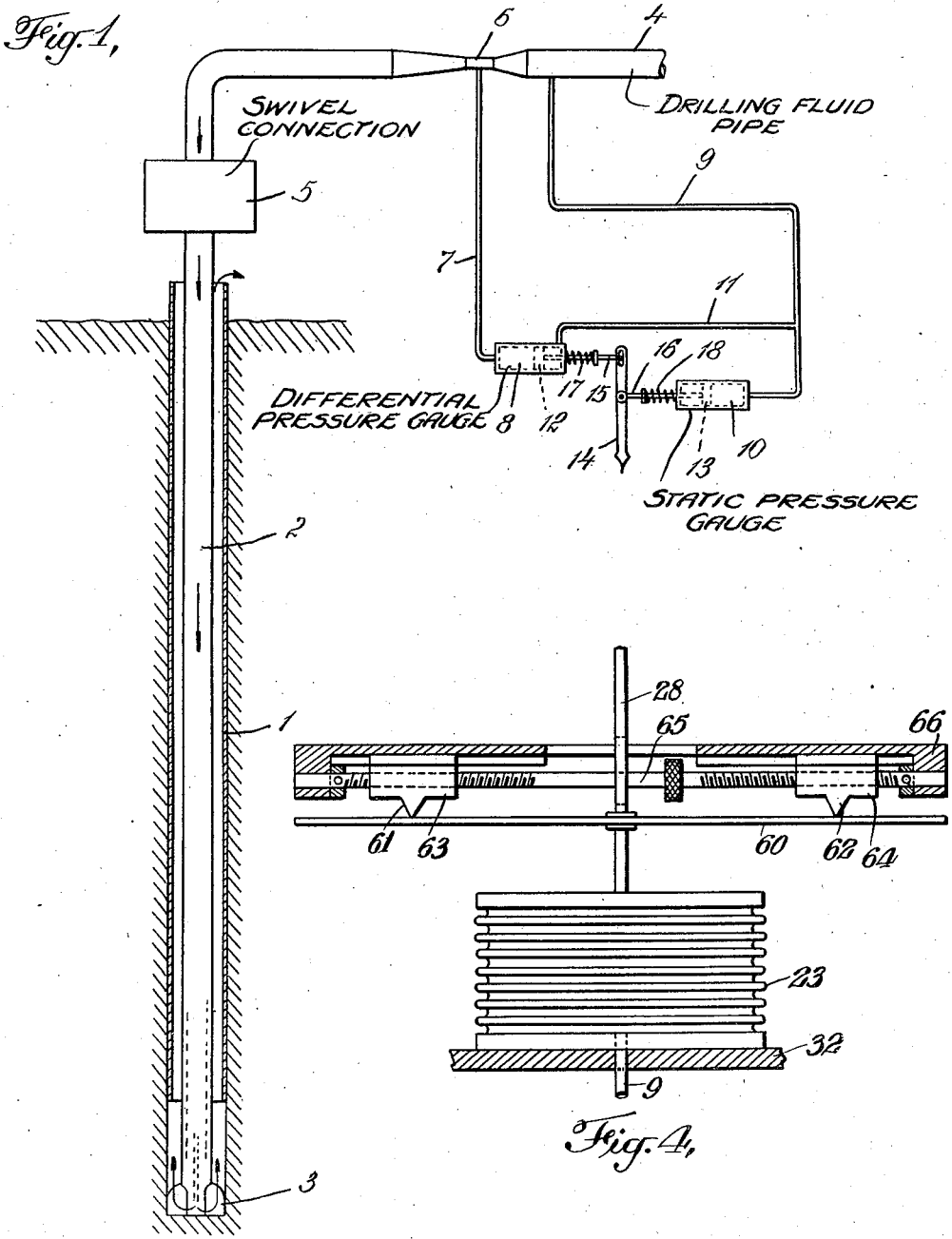

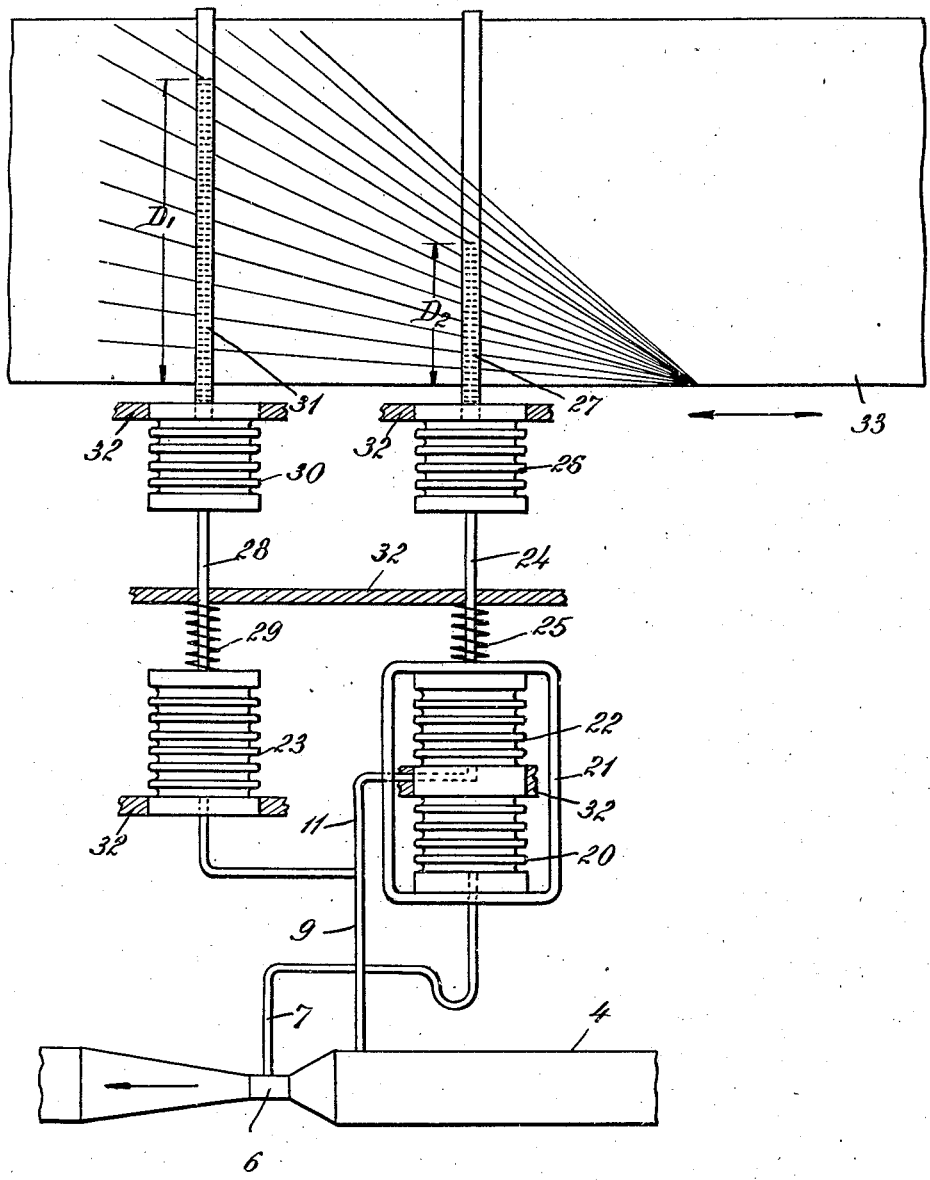

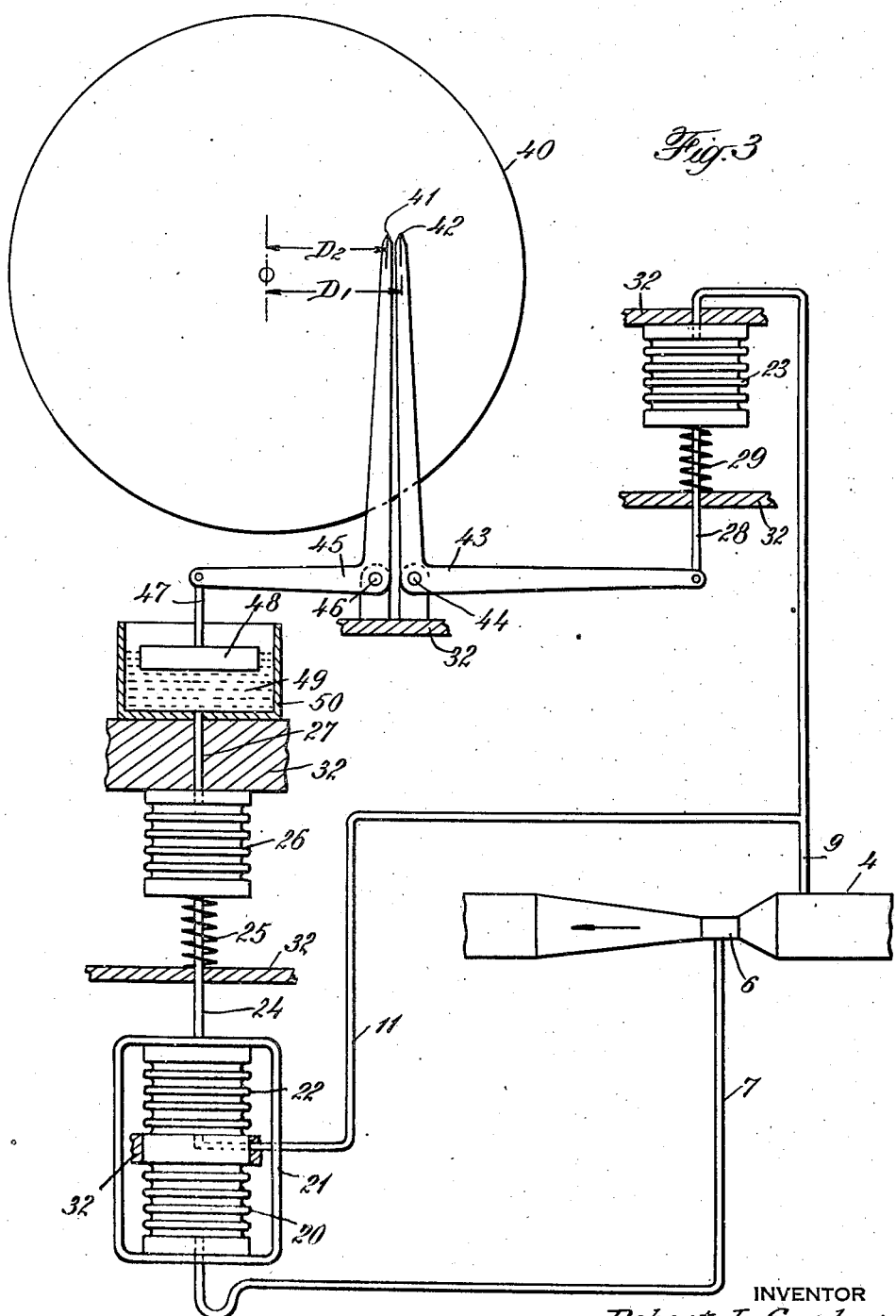

2,332,567

UNITED STATES PATENT OFFICE 2,332,567

APPARATUS FOR DETERMINING LEAKS IN DRILL PIPE

Robert I. Gardner, Bakersfield, Calif., assignor to Richfiield Oil Corporation, Los Angeles, Calif., a corporation of Delaware Application February 26, 1941, Serial No. 380,657

2 Claims. (Cl. 73—51)

This invention relates to well drilling and is concerned particularly with the detection of leaks or washouts in drill pipe.

In the drilling of wells with a rotary rig, a string of drill pipe bearing a bit or cutting tool at its lower end is rotated in the hole, and cuttings are removed from the bottom of the hole by means of a current of drilling fluid (mud) that is delivered to the bit through the drill pipe and is returned to the top of the well through the bored hole outside the pipe.

When a leak occurs in the drill pipe, immediate detection is highly desirable; otherwise the leak will be enlarged by erosive action of the solids in the mud until the pipe is broken. The portion of the drill pipe below the break is thus detached and lost. This necessitates a time consuming and expensive "fishing" operation. Heretofore, many fishing operations have resulted because a satisfactory means for detecting leaks as they occur has not been available.

The present invention provides apparatus for detecting leaks in drill pipes before they reach serious proportions. The apparatus of my invention responds immediately to the presence of leaks in the drill stem and to the presence of obstructions in the system caused by cave-ins or the like, but is substantially insensitive to other changes which occur in the drilling system as normal incidents of operation. Thus, the apparatus distinguishes between variations in flow conditions due to the presence of a leak in the drill stem and variations due to the presence of obstructions, such as those occasioned by cave-ins and is substantially unaffected by changes in rates of flow or pressure in the drilling system that are incident to increased depth of hole, pump regulation and wear and normal variations in the density of the drilling mud. More particularly, alteration of the speed of the mud pumps brought about by opening or closing of the throttle valve and change of volumetric efficiency of the pumps due to wearing of parts do not affect the detection apparatus.

In accordance with my invention, detection of leaks in a drill pipe during drilling operations is accomplished by providing an obstruction (by means of a Venturi tube, orifice plate or similar flow-measuring device) in the drill pipe or equivalent conduit that supplies drilling fluid to the bit, determining the pressures exerted by the drilling fluid at the point of obstruction and at a neighboring but less obstructed point in the drill pipe and observing variations in the relationship of the pressures so determined. Thus, I have found that the differential between the pressure at the point of obstruction and the pressure at a substantially unobstructed point ahead of the obstruction in the drill pipe bears a substantially constant relationship to the pressure at the unobstructed point as long as there are no leaks in the drill pipe, or cave-ins in the hole irrespective of other changes in the drilling circuit. If, however, a leak or cave-in occurs, it is indicated by a change in said relationship.

Observation of variations from the relationship which prevails when there are no leaks in the drill pipe may be made conveniently by connecting a first pressure gauge so as to determine the differential pressure existing between the obstructed and unobstructed point in the pipe and a second pressure gauge to determine the pressure at the unobstructed point, and by causing the two gauges to cooperate to indicate a change in the relationship of the quantities determined by the respective gauges. For example, the point at which the obstruction occurs in the drilling fluid pipe may be connected to one end of a differential pressure gauge, a point preceding it in the pipe being connected to the other end of that gauge and to a second pressure gauge. In such case, the two gauges may be connected to a suitable indicator, in such fashion that their movements oppose each other. The indicator is set at zero or some other value while the drilling operation is proceeding and while there are no leaks in the drill pipe. Thereafter, if a leak occurs in the drill pipe the indicator will deflect in one direction. If an obstruction in the drilling circuit occurs as a result of caving walls, or other accident, the indicator will deflect in the opposite direction.

The theory of operation of my invention is demonstrated mathematically by the following equations, which relate to a well drilling system in which a Venturi tube is provided in the conduit through which drilling fluid is forced to the bottom of the well and in which:

$P_1$ = pressure at throat (obstruction) of Venturi tube disposed in drill pipe
$P_2$ = pressure at upstream end of the venturi
$K_A$ = hydraulic constant of entire fluid circuit between the point at which $P_2$ is taken and the point at which the drilling fluid returns to the atmosphere
$K_B$ = hydraulic constant of Venturi tube
$k_1$ = constant of gauge employed to measure $P_2$
$k_2$ = constant of differential gauge employed to measure $P_2$ minus $P_1$
$K_0$ = a constant for a given set of well drilling conditions equivalent to:

$$\left[\frac{K_B}{K_A}\right]^2 \cdot \frac{k_1}{k_2}$$

$D_1$ = deflection of gauge measuring pressure $P_2$
$D_2$ = deflection of gauge measuring differential pressure ($P_2$ minus $P_1$)
$Q$ = rate of flow of fluid in circuit including Venturi tube

Equations (1) $$Q = K_A P_2^{1/2}$$

(2) $$Q = K_B (P_2 - P_1)^{1/2}$$

So
$$K_A P_2^{1/2} = K_B (P_2 - P_1)^{1/2}$$

and (3) $$P_2 = \left[\frac{K_B}{K_A}\right]^2 (P_2 - P_1)$$

(4) $$D_1 = k_1 \cdot P_2$$

or
$$P_2 = \frac{D_1}{k_1}$$

(5) $$D_2 = k_2(P_2 - P_1)$$

or
$$P_2 - P_1 = \frac{D_2}{k_2}$$

substituting (4) and (5) in (3)

(6) $$\frac{D_1}{k_1} = \left[\frac{K_B}{K_A}\right]^2 \cdot \frac{D_2}{k_2}$$

so (7) $$D_1 = \left[\frac{K_B}{K_A}\right]^2 \cdot \frac{k_1}{k_2} \cdot D_2$$

or (8) $$D_1 = K_0 D_2$$

The value of $K_0$ depends upon the values of $k_1$, $k_2$, $K_A$ and $K_B$. The two former are instrument constants and are unaffected by changes in the drilling circuit; $K_A$ and $K_B$ are affected by changes in the density of the fluid in the circuit, but these changes are small in practice and substantially equal so that there is but little change in the value of $$\left[\frac{K_B}{K_A}\right]^2$$

with changes in fluid density; consequently, changes in fluid density have little or no effect upon $K_0$. Hence, $D_1$ and $D_2$ which reflect, respectively, the values of $P_2$ and $(P_2-P_1)$ should vary to the same extent unless (a) a leak occurs in the drill pipe, or (b) an obstruction occurs in the hole. In case (a) the ratio $D_1/D_2$ will change in one direction; in case (b) the ratio will change in the opposite direction.

These and other features of my invention will be more thoroughly understood in the light of the following detailed description, taken in conjunction with the accompanying drawings in which:

Fig. 1 is a diagram of a well drilling system in which the drill pipe is equipped with one form of the leak-detection apparatus of my invention;

Fig. 2 illustrates one type of indicator for use in comparing the values $D_1$, $D_2$ determined by the respective gauges;

Fig. 3 illustrates another type of indicator for comparing the values $D_1$ and $D_2$; and Fig. 4 illustrates a spring mechanism which may be employed to vary the deflection constants $k_1$, $k_2$ of the respective gauges, so that the value of $K_0$ in any instance may be set at unity or at any other desired value.

Referring to the drawings the reference numeral 1 designates a cased well in which is arranged a drill stem 2 consisting of a number of sections of drill pipe. A bit or cutting tool 3 is arranged on the lower end of the drill pipe in the usual manner. In drilling, the drill pipe is rotated by a suitable rotary rig (not shown). A drilling fluid pipe 4 is connected to a pump or pumps (not shown) by means of which drilling fluid or mud is fed through the drill pipe to the bit in the usual manner. The drilling fluid, when it reaches the bottom of the drill pipe passes upwardly to the top of the well around the drill pipe. A swivel connection 5 which is of usual construction, is provided between the drilling fluid pipe 4 and the drill pipe 2.

The indicating device forming the subject matter of the present invention comprises an obstruction 6 in the drilling fluid pipe. In the instant case the obstruction is provided by a Venturi tube, although an orifice plate or any other equivalent element may be employed for this purpose. A pipe or tube is connected to the drilling fluid pipe at the point of obstruction (or throat of the venturi) and to one end of a pressure gauge 8. At a point in the drilling pipe preceding the obstruction a second pipe or tube 9 is connected to the drilling fluid pipe and the other end of this tube is connected to one end of a pressure gauge 10. The tube 9 is also provided with a branch 11 which is connected to the gauge 8 at the end opposite the tube 7.

Although any form of pressure gauge may be employed, I have illustrated gauges formed of cylinders with a piston 12 arranged in the gauge 8 and a similar piston 13 arranged in the cylinder 10. Pistons 12, 13 are connected to an indicator hand 14 by links 15, 16, respectively, and these links are surrounded by springs 17, 18 which tend to hold the indicator hand in the position corresponding to zero on a scale (not shown) to be used with the indicator hand.

The springs 17, 18 preferably are so constructed that their deflection per unit load can be varied, in order that the value $K_0$ may be set at unity or any desired value without the necessity of changing springs. A preferred type of spring structure for this purpose is described in detail hereinafter and is shown in Fig. 4.

It will be apparent that the apparatus of Fig. 1 provides mechanical means for automatically comparing the relationship of the deflections $D_1$, $D_2$ of the gauges 8 and 10, respectively. The gauges oppose each other so that the pointer 14 remains stationary as long as $D_1$ and $D_2$ are equal. If, however, a leak occurs in the drill stem, or if an obstruction occurs in the path of the drilling fluid the change in drilling condition will be indicated by movement of the hand 14.

The apparatus, in effect, combines the action of a Venturi tube or other obstruction in the drilling fluid pipe for increasing velocity head and the action of a static pressure gauge to the end that a positive indication of leaks or cave-ins is immediately obtained, but irrelevant changes in operating conditions do not affect the apparatus. Thus, the instrument is not affected by speeding up or slowing down of the pumps due to wearing of the parts. Change of mud weight within the usual limits will not cause a change to be shown on the indicator 14.

Because the apparatus indicates a change in the hydraulic "constant" of the drill stem, it should be set at a time when it is known that there are no leaks in the drill stem. Thus, the instrument may be calibrated when the drill stem is first run into the hole, at which time it is safe to assume that there are no leaks. As additional sections of drill pipe are added to the drill stem, the indicator will shift in a clockwise direction to a higher value. This will be expected. But, any shifting to a lower value after operating with a given amount of drill pipe indicates a leak and warns the operator that the drill stem should be removed before a serious washout occurs, with resultant breakage of the stem and consequent "fishing" operation.

Although in Fig. 1 the pressure gauges illustrated are piston and cylinder gauges, any conventional type of gauge may be employed. It is merely necessary that the pressures $P_1$ in the tube 7 and $P_2$ in the tube 9 operate to produce opposite effects in the pressure gauge 8 and that the resulting differential pressure $(P_2-P_1)$ be compared or contrasted with the pressure $P_2$ indicated by the gauge 10.

In the apparatus of Fig. 1, the differential pressure $(P_2-P_1)$ and the pressure $P_2$ are compared or contrasted by means of the indicator 14 which is actuated by the two opposing gauges. Such a mechanical means for comparing deflections is convenient but not essential—as will be apparent from consideration of the apparatus of Fig. 2.

The apparatus illustrated by Fig. 2 is the same in principle as that of Fig. 1, but employs different mechanical means for comparing the gauge deflections. Thus, the obstructed portion of the venturi 6 ($P_1$) is connected by the tube 7 to a bellows 20 mounted in a balancing frame 21 to oppose a bellows 22 which is connected to the unobstructed drill fluid pipe 4 ($P_2$) by the tube branch 11. Another branch of the pipe 9 also supplies $P_2$ to a third bellows 23.

The balancing frame responds to variations in the differential pressure $(P_2-P_1)$ and its net movement is communicated by an arm 24 (the movement of which is restricted by a spring 25) that is connected to a bellows gauge 26 filled with liquid which rises and falls in a tube 27 as the differential pressure $(P_2-P_1)$ changes.

The bellows 23 responds to variations in the pressure $P_2$ and its movement is communicated by an arm 28 (the movement of which is restricted by a spring 29) to a second bellows gauge 30. This bellows gauge is filled with liquid that rises and falls in a tube 31. The bottom of the bellows 23, the junction of the bellows 20, 22, the tops of the springs 25, 29 and the tops of the bellows 26, 30, are fixed to a base 32, that is partially shown.

The two gauge tubes are disposed substantially parallel to each other on a chart 33 provided with a series of ruled lines radiating from a point on the lower margin of the chart. The chart may be moved lengthwise as indicated by the arrow, and may be constructed as an endless belt mounted on rollers (not shown).

The operation of the apparatus of Fig. 2, briefly, is as follows:

At a period during drilling operations when it is known that there are no leaks and while fluid is passing in the pipe, the ruled sheet is shifted lengthwise until the tops of both liquid columns be on the same line. Thereafter, if the top of the liquid column ($D_1$) reflecting $P_2$ falls on a line above that reached by the top of the other liquid column ($D_2$) reflecting $(P_2-P_1)$, there is an obstacle in the drilling circuit such as would be caused by a cave-in. If $D_1$ falls on a line below that reached by $D_2$, there is a reduction in the hydraulic "constant" $K_A$ brought about by a leak in the drill stem. Each time an additional drill pipe is added to the string, the apparatus should, of course, be re-calibrated.

In the apparatus of Fig. 2, the springs may have fixed deflection constants which are different for the two gauges. If so, the movable ruled sheet must be provided. If springs having controllable deflection constants are employed, these constants may be varied until the heights of the two liquid constants are equal. The springs are set at the values thus arrived at, and thereafter the heights of the columns may vary but will remain substantially equal for a given length of drill stem unless a leak occurs therein or a diminution of flow is caused by a cave-in or the like. In the former case (leak), $D_1$ will fall below $D_2$; in the latter case (cave-in) $D_2$ will fall below $D_1$.

The apparatus of Fig. 3 is a modification of the apparatus of Fig. 2, like parts being indicated by the same reference characters, but is of the recording type. To this end, it includes a rotatable indicator dial 40 and a pair of pens 42, 41 that are in contact with the dial and are mounted upon levers that are actuated, respectively, by $P_2$ and $(P_2-P_1)$ so that the deflections $D_1$ and $D_2$ are recorded on the dial as shown. The pen 42 is mounted on the lever 43 which has a pivot 44. The other end of the lever 43 is connected to the arm 28 of the bellows 23 which varies as $P_2$. The pen 41 is mounted on the lever 45 which has a pivot 46. The opposite end of the lever 45 is attached by means of an arm 47 to a float 48 that rides at the surface of a column of liquid 49 in a tank 50. The level of the column of liquid in the tank rises and falls because the tank is connected to the liquid column 27 of the bellows gauge 26.

Otherwise, the apparatuses of Figs. 2 and 3 are substantially the same. Thus, the junction point of the bellows 20, 22, the bottom of the spring 25, the bottom of the spring 29, the top of the bellows 23 and the top of the bellows 26 are all fixed by being attached to the frame or base 32, upon which the tank 50 and the pivots 44, 46 also rest.

The springs 25, 29 in the apparatus of Fig. 3, like those of Fig. 2, are preferably adjustable, i. e., their constants of deflection per unit of weight should be variable. If the apparatus of Fig. 3 is provided with adjustable springs, the deflections $D_1$ and $D_2$ should be made equal for a normal condition of drilling in which there are no leaks or abnormal restrictions in the drilling circuit. Thereafter, $D_1$ and $D_2$ should remain substantially equal for a considerable time as drilling progresses and for a given length of drill pipe there will be no abrupt change in the relationship of $D_1$ and $D_2$ unless a leak or cave-in occurs. If $D_1$ suddenly increases with respect to $D_2$, a cave-in or the like is indicated. If $D_2$ becomes greater than $D_1$, a leak is indicated.

The springs 25, 29 in the apparatus of Figs. 2 and 3 are shown diagrammatically. A preferred form of spring structure which permits the deflection constant to be varied is shown in Fig. 4. This type of spring structure should be employed in the positions shown by the springs in positions 25, 29.

Referring to Fig. 4, it will be observed that a conduit, for example, a branch of the tube 9 is connected to a bellows, for example, the bellows 23 mounted on the base 32. A rod, for example, the rod 28 is fastened to the other end of the bellows. The rod 28 is attached at its center to a leaf spring 60 which extends substantially horizontally in contact with knife edges 61, 62, and controls the movement of the rod. These knife edges are fastened to threaded sliders 63, 64 and may be moved back and forth from the center of the spring by means of the adjusting screw 65, the two ends of which are threaded oppositely into the respective sliders. The adjusting screw is journalled at its ends in thrust bearings in a base member 66 which is slotted to provide tracks for the sliders.

The deflection constant of the leaf spring 60 can be changed at will by turning the adjusting screw so that the effective length of the spring between knife edges 61, 62 is changed. If the apparatus of Fig. 2 or the apparatus of Fig. 3 is equipped with the spring structure shown in Fig. 4, the deflections $D_1$ and $D_2$ may be made equal for any set of conditions, i. e., the "constant" $K_0$ may be set at unity or any other desired value.

It will be apparent that many other types of indicating mechanisms, both mechanical and electrical, may be employed in place of those shown, without departing from the concept of my invention. Thus, electrical indicators, such as electrical strain gauges, may be employed.

I claim:

1. Apparatus for determining leaks or obstructions in drill pipes comprising means for delivering drilling fluid to the drill pipe at a substantially constant rate, an obstruction in the drilling fluid delivery means, a pressure gauge having one side connected to the delivery means at the point of obstruction and the other side connected to the delivery means at a point neighboring the obstruction, a second pressure gauge connected to the delivery means at the second point, and indicating means connected to the two gauges.

2. Apparatus for determining leaks or obstructions in drill pipes comprising a drilling fluid pipe connected to the drill pipe for the delivery of drilling fluid at a substantially constant rate, a Venturi tube arranged in the drilling fluid pipe, a pressure gauge, a connection between the Venturi tube and one side of the pressure gauge, a second connection between the drilling fluid pipe at a point preceding the Venturi tube and the opposite side of the pressure gauge whereby differential between static pressure and the pressure at the throat of the Venturi tube is obtained, a second pressure gauge with which said second connection communicates whereby static pressure of the drill pipe is obtained, and indicating means controlled by the combined action of the two gauges.

ROBERT L. GARDNER.